(12) United States Patent
Nagahori et al.

(10) Patent No.: US 7,190,194 B2
(45) Date of Patent: Mar. 13, 2007

(54) ACTIVE HYBRID TRANSFORMER CIRCUIT HAVING A REPLICA DRIVER

(75) Inventors: Takeshi Nagahori, Kawasaki (JP); Mitsutoshi Sugawara, Santa Clara, CA (US)

(73) Assignees: NEC Electronics Corporation, Kanagawa (JP); NEC Electronics America, Inc., Santa Clara, CA (US)

( * ) Notice: Subject to any disclaimer, the term of this patent is extended or adjusted under 35 U.S.C. 154(b) by 178 days.

(21) Appl. No.: 10/777,676

(22) Filed: Feb. 13, 2004

(65) Prior Publication Data

US 2005/0179473 A1   Aug. 18, 2005

(51) Int. Cl.
 *H03K 3/00* (2006.01)
(52) U.S. Cl. ...................................... 327/110
(58) Field of Classification Search ................ 327/108, 327/110; 375/257, 258
See application file for complete search history.

(56) References Cited

U.S. PATENT DOCUMENTS 5,204,854 A * 4/1993 Gregorian et al. .......... 370/288
6,552,634 B1 * 4/2003 Raab ........................... 333/216
2001/0016021 A1 * 8/2001 Chan ........................... 375/346
2005/0069394 A1 * 3/2005 Dyer et al. ................... 410/84

FOREIGN PATENT DOCUMENTS

DE         200 01 581 U1   5/2000
JP         H04-54718 A     2/1992
JP         H04-158637 A    6/1992

OTHER PUBLICATIONS

Roo et al., "A CMOS Transceiver Analog Front-End for Gigabit Ethernet over CAT-5 Cables", 2001 IEEE International Solid State Circuit Conference, Feb. 7, 2001, pp. 310-311.

* cited by examiner

*Primary Examiner*—My-Trang Nu Ton
(74) *Attorney, Agent, or Firm*—Sughrue Mion, PLLC

(57) ABSTRACT

In an active hybrid transformer circuit connected to both transmit and receive sides, a current driver is connected to a transmission path circuit through a common connection point of a load resistor and a replica resistor while a replica driver is connected to the replica resistor of which another connection point is directly connected to the receive side. The replica driver may be formed by a DAC of a current output type. A current ratio of the replica driver and the current driver is selected at a predetermined value so as to prevent a transmit signal from leaking into the receive side.

13 Claims, 9 Drawing Sheets

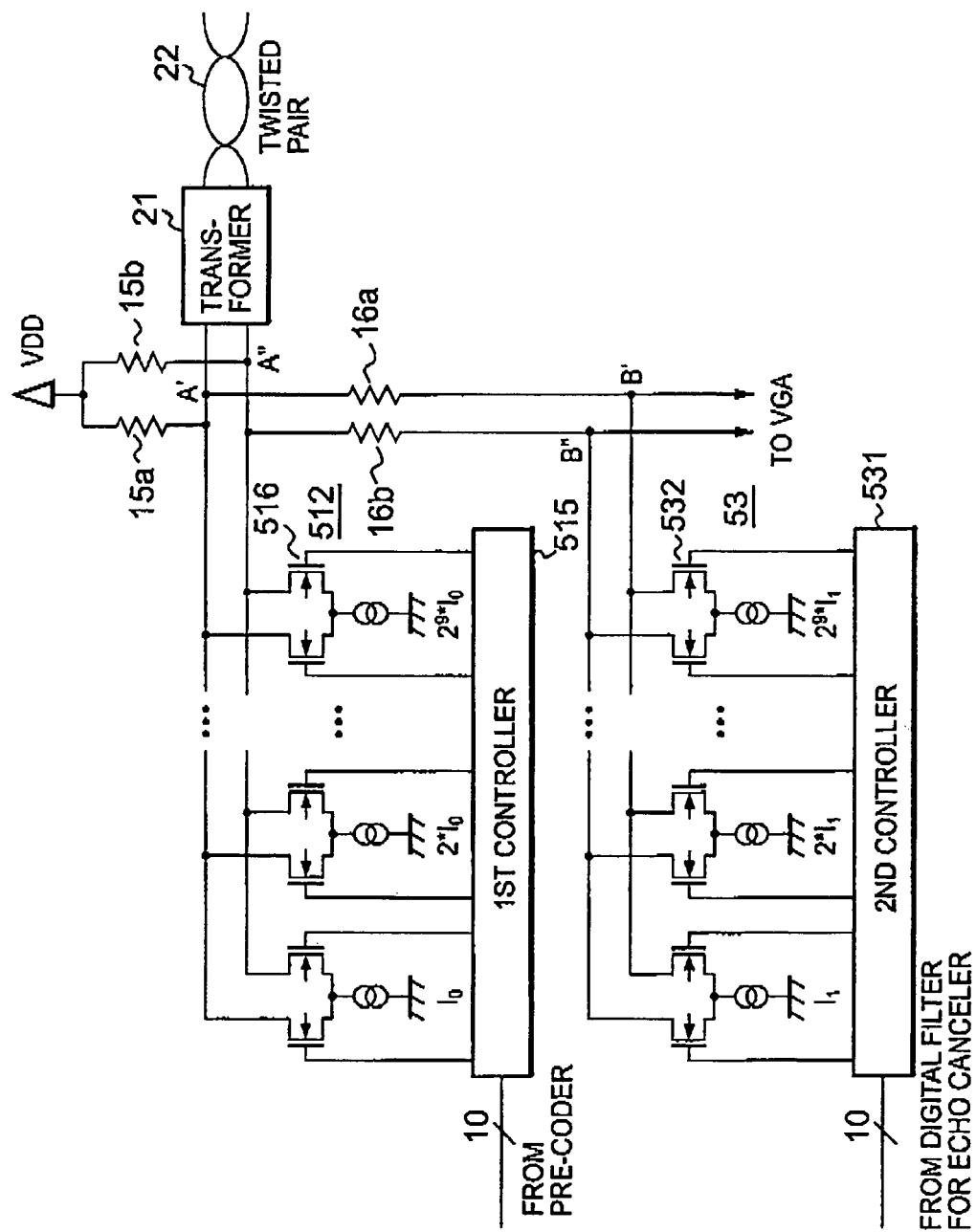

ACTIVE HYBRID TRANSFORMER CIRCUIT HAVING A REPLICA DRIVER

BACKGROUND OF THE INVENTION

This invention relates to an active or adaptive hybrid transformer circuit (will be called an active hybrid transformer circuit hereinafter in the instant specification) for use in bidirectional metallic cable communication to separate a transmission or transmit (TX) signal and a reception or receive (RX) signal.

A recent interest has been directed to high speed bi-directional communication trough metallic cables, such as 10 GBASE-T, among a plurality of terminal stations each of which has a transmitter/receiver connected through the metallic cables operable as a transmission path circuit. In this event, each terminal station must separate a transmit (TX) signal and a receive (RX) signal from each other so as to carry out the bi-directional communication. To this end, a hybrid transformer circuit is built in each terminal station.

Conventionally, Japanese Unexamined Patent Publication No. Hei 4-54718 (namely, 54718/1992) discloses a combination of a hybrid transformer circuit and an echo canceller. This structure makes it possible to accomplish high separation between the TX and the RX signals. However, the disclosed combination is complicated in structure and results in an increase of a size and is also not suitable for high speed communication.

Alternatively, Japanese Unexamined Patent Publication No. Hei 4-158637 (namely, 158637/1992) discloses an active hybrid transformer circuit which includes a voltage driver and a balancing network. Herein, the balancing network is formed by a variable hybrid circuit and a switch circuit for switching resistors and capacitors included in the variable hybrid circuit. Furthermore, it is to be noted that the voltage driver should be linearly operated.

Consideration would be made about application of such an active hybrid transformer circuit to a communication system of a high speed among an increased number of terminal stations. In this event, the voltage driver should have a high speed characteristic and a low non-linear distortion characteristic. However, it is practically difficult to realize such a voltage driver of a high speed and a low non-linear distortion characteristic as long as restrictions are practically imposed on a source voltage and power consumption.

Furthermore, disclosure is made about an active echo canceller in the article that is contributed to 2001 IEEE International Solid-State Circuit Conference, pages 310 to 311, and that is entitled "A CMOS Transceiver Analog Front-End for Gigabit Ethernet over CAT-5 Cables". The active echo canceller mentioned in the article uses a replica transmit signal and serves to effectively remove a transmit signal from a receive signal. Specifically, the active echo canceller has a current drive transmitter which is formed by a digital-to-analog converter (DAC) and a main driver coupled to a transmission path circuit through a transformer. In addition, the active echo canceller further has a replica driver connected in parallel with the main driver.

With this structure, digital transmit codes are converted by the DAC into the transmit current or transmit signal. The transmit current is given through the main driver to the transformer and to the replica driver which produces the replica transmit signal representative of a replica of the transmit current. The receive signal is obtained by subtracting the replica transmit signal from the transmit signal by the use of an analog subtracter so as to cancel the transmit signal in the receive signal.

According to the inventor's experimental studies, it has been found out in an active echo canceller of the above-mentioned type that an amount of attenuation is restricted to at most 10 dB on account of a component returned from the transmit signal to the receive signal and that the analog subtracter with a low non-linear distortion can not be easy to really attain.

SUMMARY OF THE INVENTION

It is an object of this invention to provide an active hybrid transformer circuit which is operable at a high speed and with a low non-linear distortion.

It is another object of this invention to provide an active hybrid transformer circuit of the type described, which is simple in structure by dispensing with any analog subtracter.

It is still another object of this invention to provide a circuit which can cancel an echo without using any subtracter.

An active hybrid transformer circuit is for use in bi-directional metallic cable communication to separate a transmit (TX) signal and a receive signal (RX). According to an aspect of this invention, the active hybrid transformer circuit comprises a current driver for the transmit signal, a load resistor connected to the current driver, a replica driver, and a replica resistor connected between the load resistor and the replica driver. A first point of connection between the replica resistor and the load resistor is connected to a transmission path circuit while a second point of connection between the replica driver and the replica resistor is connected to a receive side.

According to another aspect of this invention, a current ratio between the current driver and the replica driver is represented by a complex number. At least one of a real part and an imaginary part of the complex number may be variable.

Specifically, the current ratio is given by:

$$-(R_D//Z_L/R_D//Z_L+R_{REP}),$$

where $R_D$ is representative of a resistance value of the load resistor; $R_{REP}$, a resistance value of the replica resistor, and $Z_L$, an impedance seen from a transmitter/receiver to the transmission path circuit.

According to still another aspect of this invention, the active hybrid transformer circuit further comprises a circuit element which includes either of a capacitor and an inductor and which is connected in parallel with the replica driver.

The replica driver may comprise a digital filter circuit which varies at least one of the real part and the imaginary part and which has an impedance circuit. A real part and an imaginary part of an impedance in the impedance circuit are equal to those of the impedance $Z_L$, respectively.

In addition, the current driver and the replica driver are implemented by a DAC (digital-to-analog converter) of a current output type.

Alternatively, the replica driver is a digital to analog converter connected to a digital filter trained by a training signal.

According to another aspect of this invention, an active hybrid transformer circuit for use in bi-directional metallic cable communication to separate a transmit (TX) signal and a receive signal (RX) and comprises a current driver for the transmit signal, a load resistor connected to the current driver, a replica driver, and a replica impedance connected between the load resistor and the replica driver, a first point of connection between the replica impedance and the load resistor being connected to a transmission path circuit, a second point of connection between the replica driver and the replica impedance being connected to a receive side. In this event, the current ratio α has only a real part and the replica impedance $Z_{REP}$ is given by:

$$Z_{REP} = ((1/\alpha) - 1)(R_D // Z_L),$$

where $R_D$ is representative of a resistance value of the load resistor; and $Z_L$, an impedance seen from a transmitter/receiver to the transmission path circuit.

BRIEF DESCRIPTION OF THE DRAWINGS

FIG. 8 shows a concrete circuit diagram of the active hybrid transformer circuit illustrated in FIG. 7.

DESCRIPTION OF THE PREFERRED EMBODIMENTS

Principle of the Invention

Figure 1:
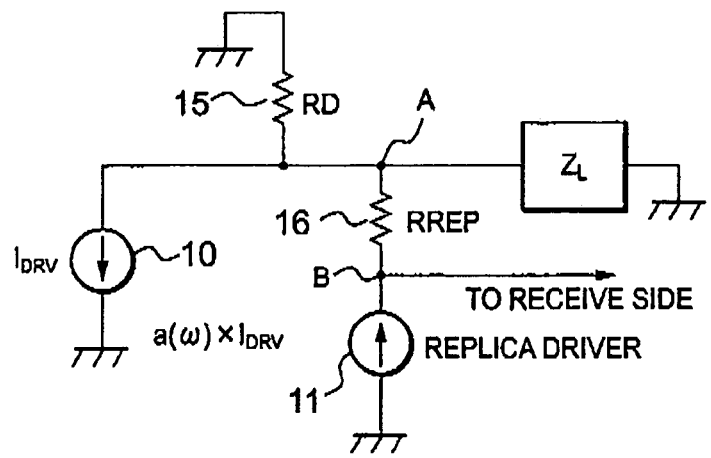
FIG. 1 shows a circuit diagram for describing a principle of an active hybrid transformer circuit according to this invention.

Referring to FIG. 1, description will be at first made about an active hybrid transformer circuit according to this invention for a better understanding of this invention. The illustrated active hybrid transformer circuit is coupled between a transmitter/receiver and a transformer connected to a transmission path that may be formed by bi-directional metallic cables, such as unshielded twisted pair (UTP). In the illustrated example, the transmission path is specified by an impedance $Z_L$ seen from the transmitter/receiver while the transmitter/receiver is represented by a current driver 10 of the transmitter. The current driver 10 serves to produce a transmit (TX) signal, namely, a transmit current signal (therefore may be called a TX current and depicted by $I_{DRV}$).

The active hybrid transformer circuit is featured by a replica driver 11 which is connected to the receiver (not shown in this figure). The replica driver 11 is operated to produce a replica current signal $I_{REP}$ which is related to the transmit (TX) signal (namely, $I_{DRV}$), supplied from the transmitter, as will be described later in detail. It is to be understood that the replica current signal $I_{REP}$ is representative of a replica of the transmit (TX) signal and is specified by a current amplitude represented by $\alpha I_{DRV}$, where α stands for a current ratio of the replica current signal $I_{REP}$ to the transmit signal $I_{DRV}$. As shown in FIG. 1, the illustrated current driver 10 has one terminal grounded and the other terminal. In addition, it is assumed that the illustrated current ratio α is represented by a complex number composed of a real part and an imaginary part. In this connection, the current ratio in FIG. 1 is expressed in the form of α(jω).

Herein, the transmit (TX) signal $I_{DRV}$ may be produced by allowing a digital transmit signal to pass through a digital-to-analog converter (DAC) while the replica current signal $I_{REP}$ may be obtained, for example, by allowing a digital transmit signal to pass through a digital filter and/or another analog echo canceller.

The illustrated active hybrid transformer circuit further has a load resistor ($R_D$) 15 connected between the ground and the other terminal of the current driver 10 that is connected in common to one terminal of a replica resistor 16. Thus, a common connection point of the load resistor ($R_D$) 15 and the replica resistor ($R_{REP}$) 16 may be called a connection point A. The replica resistor ($R_{REP}$) 16 has another terminal connected to the replica driver 11 through a connection point B. Thus, the replica resistor ($R_{REP}$) 16 is connected between the connection points A and B.

From this fact, it is to be noted that the connection point B between the replica resistor ($R_{REP}$) 16 and the replica driver 11 is connected direct to the receiver or receiver side without any subtracter. This structure is different from a conventional transformer of this type and is effective to simplify the transmitter/receiver.

With this structure, consideration would be made about isolating the receiver from the transmitter by canceling an echo component returned from the transmitter back to the receiver. In this event, it has been found out that the receiver or receiver side can be completely isolated from the transmitter or transmitter side on the condition that the voltage vB at the connection point B becomes equal to zero. Such a condition can be achieved in the illustrated active hybrid transformer circuit by controlling the current ratio α(jω) in the replica driver 11 in a manner to be described below.

At first, it is assumed that voltages at the connection points A and B be represented by vA and vB while currents caused to flow through $R_D$, $R_{REP}$, and $Z_L$ are represented by $i_{RD}$, $i_{REP}$, $i_{ZL}$; and $R_D // Z_L$, impedance for parallel connection of $R_D$ and $Z_L$. As shown in FIG. 1, the transmit (TX) signal, namely, a transmit current $I_{DRV}$ is given by:

$$I_{DRV} = i_{RD} + i_{REP} + i_{ZL}, \quad (1)$$

Herein, $i_{RD}$, $i_{REP}$, and $i_{ZL}$ are given by:

$$i_{RD} = vA/R_D, \quad (2)$$

$$i_{ZL} = vA/Z_L, \text{ and} \quad (3)$$

$$i_{REP} = (vA - vB)/R_{REP} = -\alpha(j\omega)I_{DRV} \quad (4)$$

Under the circumstances, when vB=0, vA in Equation (4) is represented by:

$$i_{REP} + \alpha(j\omega)I_{DRV} = 0 \quad (5)$$

In this event, the voltage vA in Equation (3) is rewritten into:

$$vA = -\alpha(j\omega)I_{DRV} \times R_{REP}. \quad (6)$$

Substitution of Equations (6) into Equations (2) and (3) gives:

$$i_{RD} = -\alpha(j\omega)I_{DRV} \times R_{REP}/R_D \quad (7)$$

$$i_{ZL} = -\alpha(j\omega)I_{DRV} \times R_{REP}/Z_L. \quad (8)$$

Substituting Equations (7), (8), and (4) into Equation (1) gives:

$$I_{DRV} = -\alpha(j\omega)I_{DRV}((R_{REP}/R_D)+(R_{REP}/Z_L)+1). \quad (9)$$

From Equation (9), it is readily possible to determine the current ratio $\alpha(j\omega)$ of rendering vB into zero by the following equation (10).

$$\alpha(j\omega) = -(R_D//Z_L)/((R_D//Z_L)+R_{REP}). \quad (11)$$

In other words, when the current ratio $\alpha$ is adjusted so that Equation (11) is satisfied, complete isolation can be accomplished between the transmitter and the receiver by using the illustrated active hybrid transformer circuit. This shows that the above-mentioned structure makes it possible to completely separate the transmit (TX) signal from the receive (RX) signal by selecting the current ratio $\alpha(j\omega)$ so that Equation (11) holds. Practically, it is possible to realize the above-mentioned current ratio $\alpha(j\omega)$ by a digital filter.

EMBODIMENTS

Figure 2:
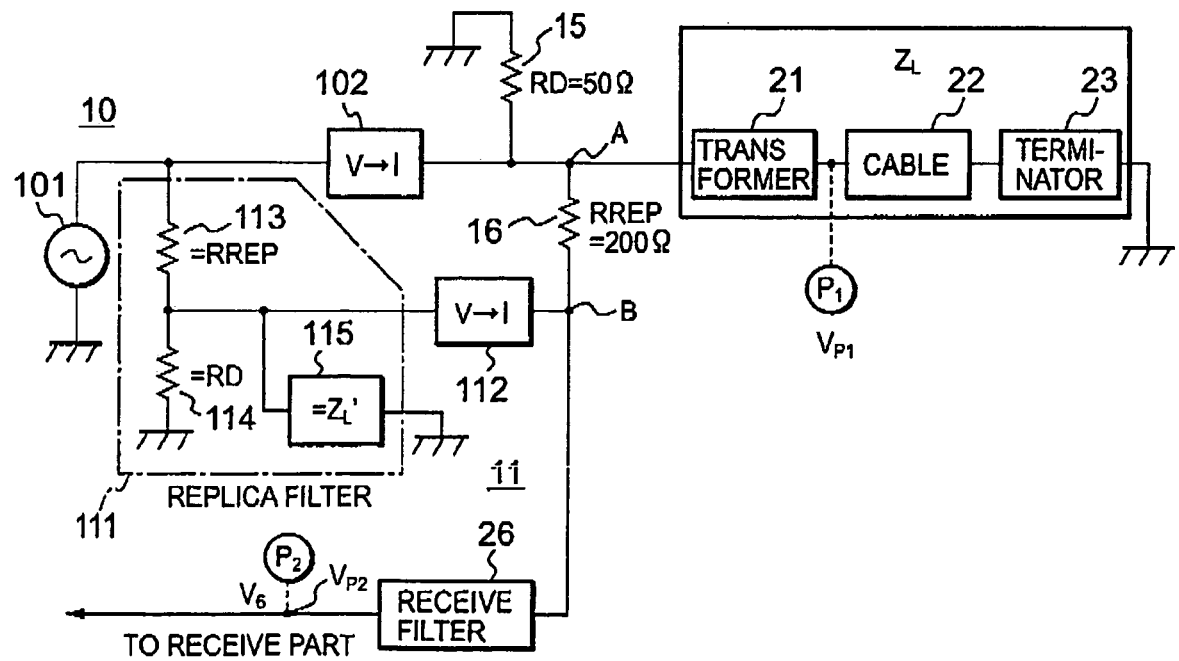
FIG. 2 shows a circuit diagram for describing an active hybrid transformer circuit according to a first embodiment of this invention.

Referring to FIG. 2, an active hybrid transformer circuit according to a first embodiment of this invention is based on the above-mentioned principle and has similar parts designated by like reference numerals and symbols in FIG. 1. The illustrated active hybrid transformer circuit has a voltage driver 101 and a first voltage-to-current converter (depicted by V-I in FIG. 2) 102, both of which are operable as the current driver 10, while the replica driver 11 is constructed by a replica filter 111 and a second voltage to current converter 112. In the illustrated example, each of the current driver 10 and the replica driver 11 is thus implemented by a combination of the voltage driver and the voltage to current converter.

In FIG. 2, the transmission path with the impedance $Z_L$ is actually formed by a transformer 21, a cable 22, and a terminator 23. In the illustrated transmission path, a first terminal P1 is derived between the transformer 21 and the cable 22. On the other hand, the illustrated receive side is represented only by a receive filter 26 which is connected to the other receive part (omitted from FIG. 2) included in the receive side, as well known in the art. A second terminal P2 is derived from an output terminal of the receive filter 26. It is to be noted that the first and the second terminals P1 and P2 are used to measure a transmit (or transmission) (TX) signal and a receive (or reception) (RX) signal, as will become clear as the description proceeds.

The replica filter 111 is structured by a series circuit of first and second filter resistors 113 and 114 connected between the voltage driver 101 and the ground. A ratio between the first and the second filter resistors ($R_{REP}$) 113 and ($R_D$) 114 is equal to a ratio between the replica resistor ($R_{REP}$) 16 and the load resistor (RD) 15 illustrated in FIG. 1. The replica filter 11 further has an impedance circuit 115 with an input impedance $Z_L'$. The input impedance $Z_L'$ of the impedance circuit is selected in relation to the impedance $Z_L$ of the transmission path in the following manner in order to investigate a characteristic of the illustrated active hybrid transformer circuit.

At first, simulation has been made on the assumption that only a real part of the input impedance $Z_L'$ is identical with that of the impedance $Z_L$. Namely, an imaginary part of the input impedance $Z_L'$ is assumed to be different from that of the impedance $Z_L$. Under the circumstances, an input signal of a predetermined frequency has been generated from the voltage driver 101 to be supplied to the voltage to current converter 102 and the replica filter 111. In this state, voltages Vp1 and Vp2 at the first terminal P1 and the second terminal P2 have been calculated to detect whether or not the receive (RX) signal is completely separated from the transmit (TX) signal. Herein, simulation conditions will be enumerated below.

Figure 3:
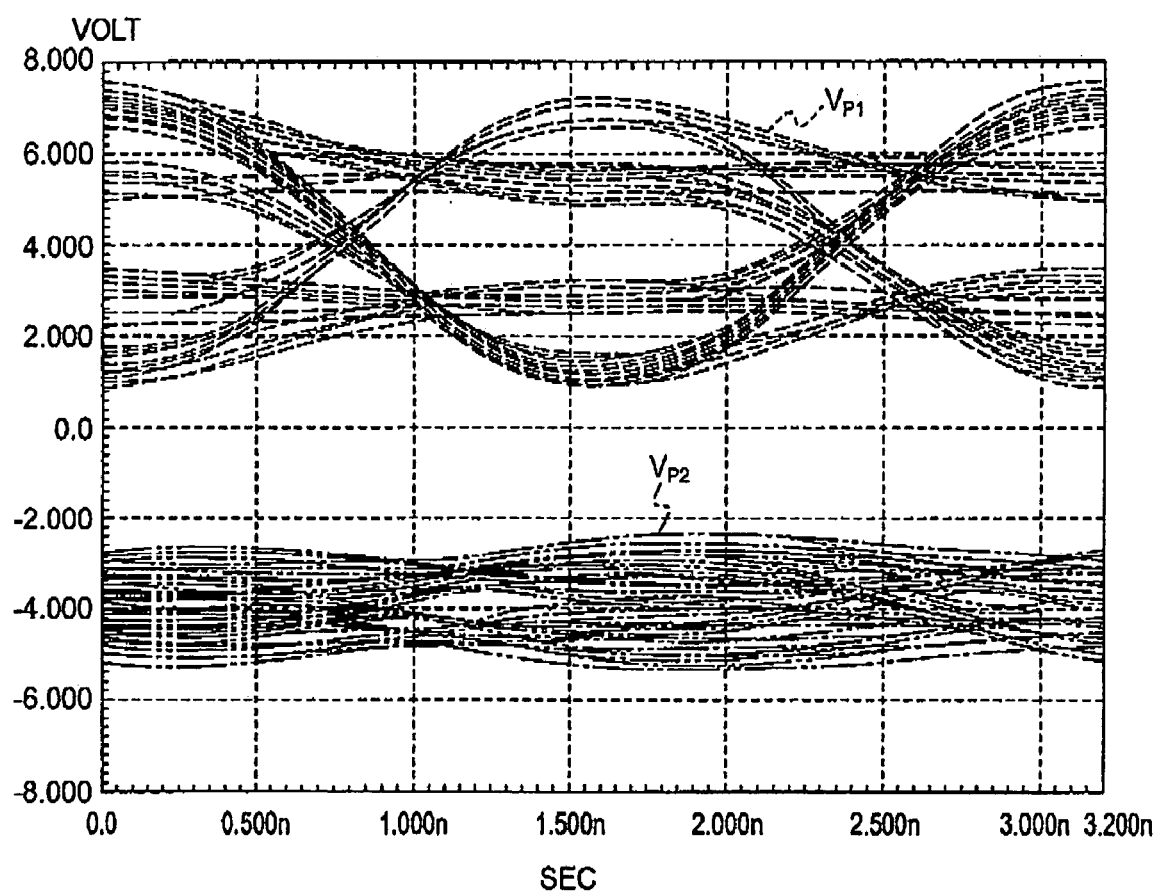
FIG. 3 shows a graph for describing a characteristic of the active hybrid transformer circuit illustrated in FIG. 2 on a certain condition.

Input signal: Binary pseudo random signal of 625 Mbps
Receive filter 26: Third-order Low Pass Butterworth Filter with a cutoff frequency of 375 MHz:
Transformer 21: described by RLGC model:
Cable 22: described by RLGC model:
Terminator 23: Resistor of 50Ω:
Load resistor RD: 50Ω:
Replica resistor $R_{REP}$: 200 Ω:

Referring to FIG. 3, results of the above-mentioned simulation have been shown. In FIG. 3, curves Vp1 and Vp2 are made to correspond to the voltages Vp1 and Vp2 at the points P1 and P2 illustrated in FIG. 2, respectively, and are offset by +4 V and −4V, respectively, from 0 V, for convenience of illustration. In FIG. 3, the input signal has been sent from the voltage driver 101 to the transformer 21 and has appeared, as shown in the curves Vp1. On the other hand, the input signal has partially leaked as shown in the curves Vp2 in FIG. 3.

Moreover, similar simulation has been made on the conditions that both the real and the imaginary parts of the input impedance $Z_L'$ are identical with those of the path impedance $Z_L$, respectively. The results of the simulation are shown in FIG. 4.

Figure 4:
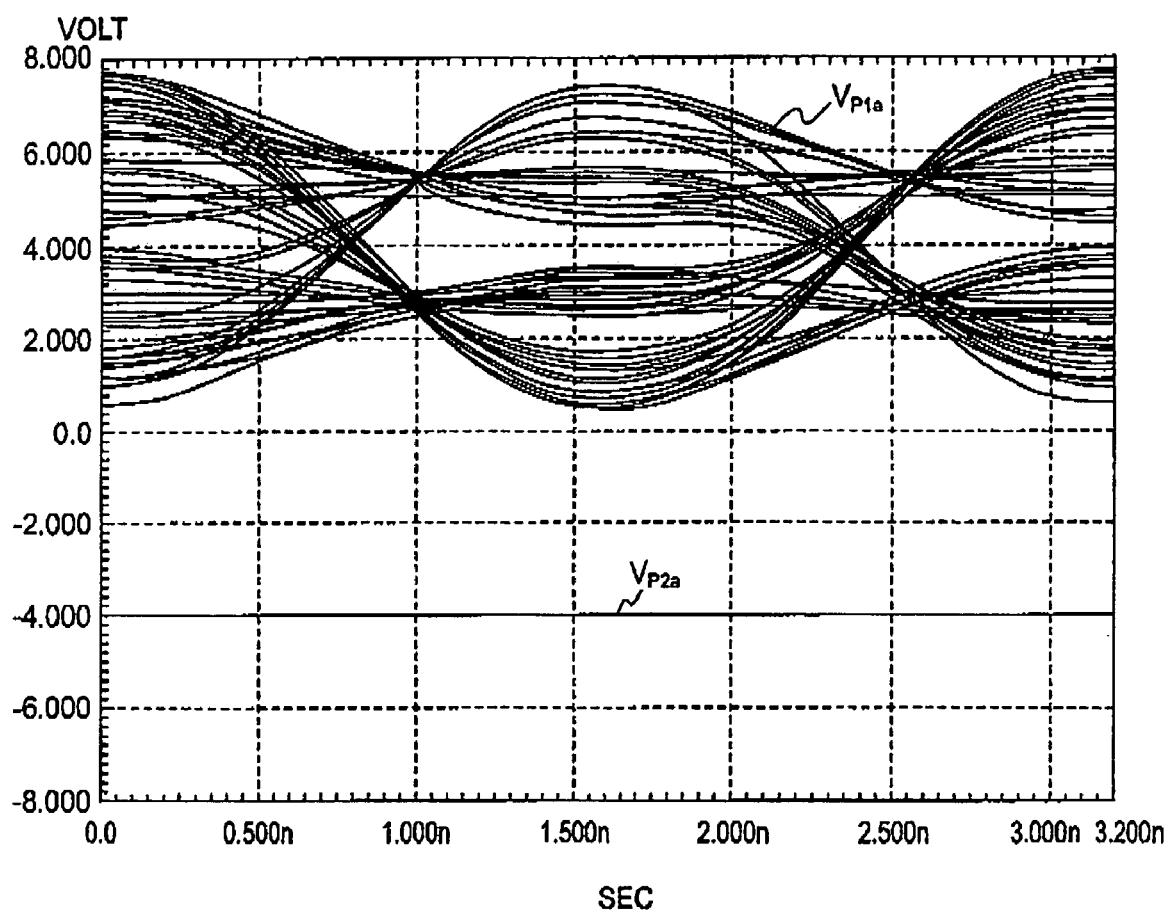
FIG. 4 shows a graph for describing a characteristic of the active hybrid transformer circuit illustrated in FIG. 2 on another condition.

As shown in FIG. 4, the input signal has appeared at the point P1 (FIG. 2), as depicted by curves Vp1a and rarely appeared at the point P2 (FIG. 2), as depicted by a straight line Vp2a along a line of −4 volt. In other words, a leak component of the input signal (transmit (TX) signal) to the receive side becomes substantially equal to zero in the active hybrid transformer circuit illustrated in FIG. 2. This shows that the receive filter 26 in FIG. 2 has been completely electrically separated or isolated from the transmission path circuit. From this fact, it is readily understood that it is important to make both the real and the imaginary parts of the impedance $Z_L'$ equal to those of the path impedance $Z_L$, respectively, in order to accomplish complete separation between the transmit and the receive signals. Thus, each of the real and the imaginary parts of the impedance $Z_L'$ should be precisely controlled by the circuit shown in FIG. 2.

Figure 5:
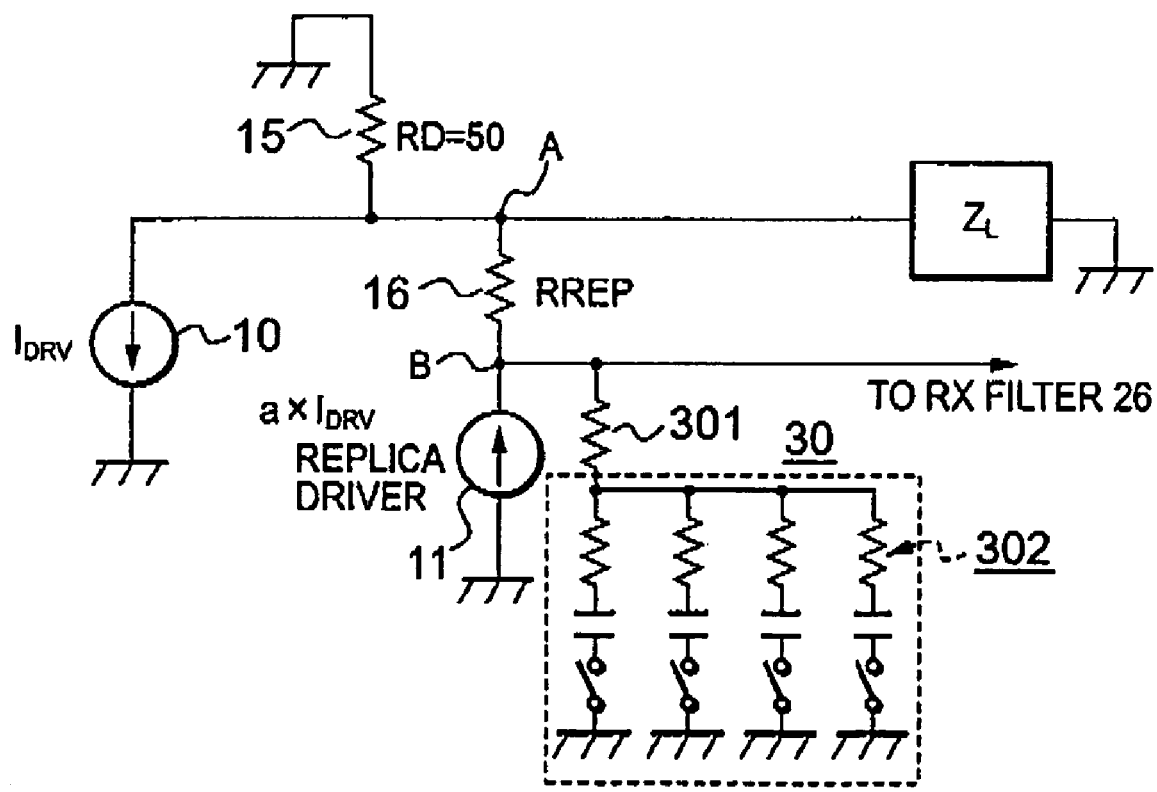
FIG. 5 shows a circuit diagram for describing an active hybrid transformer circuit according to a second embodiment of this invention.

Referring to FIG. 5, an active hybrid transformer circuit according to a second embodiment of this invention is simply featured by dispensing with any voltage to current converter (V-I) having a linear characteristic and is different in structure from that illustrated in FIG. 2. Specifically, the active hybrid transformer circuit of FIG. 5 has similar parts designated by like reference numerals and a variable impedance circuit 30 connected between the point B and the ground. In FIG. 5, the transmission path circuit, such as the transmitter, the unshielded twisted pair (UTP) is featured by the impedance $Z_L$. In addition, the illustrated variable impedance circuit 30 is structured by a common resistor 301 and a plurality of series circuits (collectively depicted by 302) which are connected in parallel with one another and which are equal in number to four in FIG. 5. Each of the series circuits 302 has a resistor, a capacitor, and a switch all of which are connected in series between the common resistor 301 and the ground. Each capacitor of the series circuits may be replaced by an inductor. Alternatively, each series circuit may be formed by all of a capacitor, an inductor, and a resistor.

With this structure, the switches included in the series circuits can be selectively switched on or off by a control circuit (not shown in this figure) so as to vary an impedance of the series circuits 302 from one to another. At any rate, the illustrated structure makes it possible to satisfy the current ratio $\alpha$ given by Equation (10) by determining a suitable impedance by selecting the series circuits 302 under control of the control circuit. Preferably, each switch may be implemented by an MOS transistor.

Figure 6:
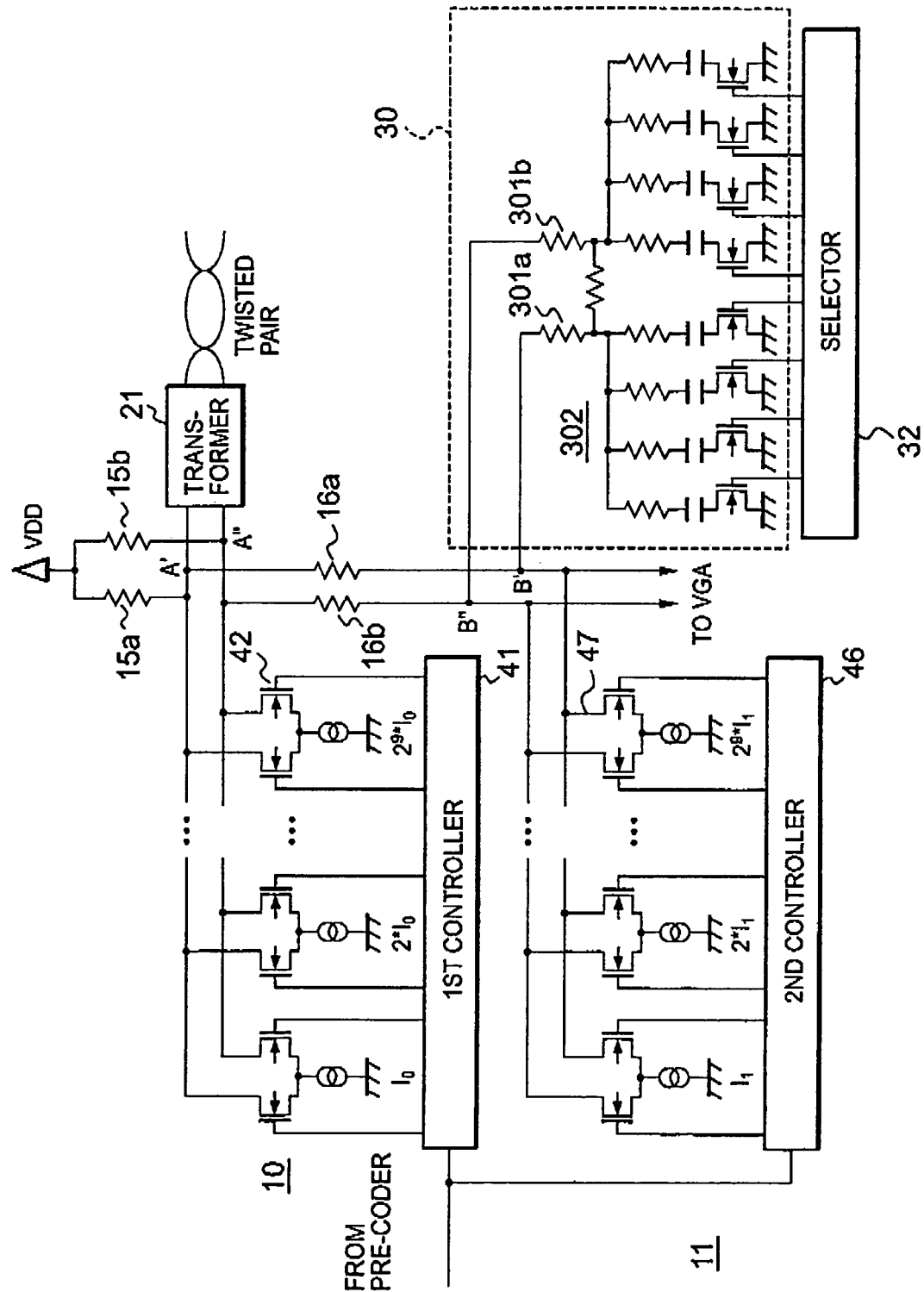
FIG. 6 shows a concrete circuit diagram of the active hybrid transformer circuit illustrated in FIG. 6.

Referring to FIG. 6, the active hybrid transformer circuit illustrated in FIG. 5 is supplied from a pre-coder (not shown in this figure) as the transmit signal with a digital signal of 10 bits. In the illustrated example, the current driver 10 is realized by a first controller 41 and a first switch section 42 both of which are operable as a first digital-to-analog converter. Likewise, the replica driver 11 is also realized by a second controller 46 and a second switch section 47 both of which serve as a second digital-to-analog converter.

In addition, the load resistor 15 is specifically shown by load resistor elements 15a and 15b which are connected to two lines, respectively. The load resistor elements 15a and 15b are connected between a power source (VDD) and points A' and A". Likewise, the replica resistor 16 is specifically shown by replica resistor elements 16a and 16b which are inserted in two lines, respectively, and which are connected between the points A' and B' and between the points A" and B", respectively.

Moreover, the illustrated variable impedance circuit 30 is formed by a pair of common resistor elements 301a and 301b and series circuits 302 connected to the common resistor elements 301a and 301b in series, respectively. A selector 32 is connected to the switches of the series circuits 302 to selectively turn them into on-states or off-states. As shown in FIG. 6, the switches in the series circuits 302 are structured by n-MOS transistors.

In FIG. 6, the digital signal of ten bits is sent from the pre-coder as the transmit (TX) signal and is delivered to both the first and the second controllers 41 and 46. In the illustrated example, the first switch section 42 connected to the first controller 41 has ten pairs of n-MOS transistors and first through tenth current sources represented by I0 to $2^9 \times$I0 and connected to the respective pairs of n-MOS transistors. Similarly, the second switch section 47 connected to the second controller 46 also has ten pairs of n-MOS transistors and first through tenth current sources represented by I0 to $2^9 \times$I0 and connected to the respective pairs of n-MOS transistors, as illustrated in FIG. 6.

With this structure, each of the first and the second controllers 41 and 46 is given the transmit signal to supply select signals to the n-MOS transistor pair or pairs. Responsive to the select signals, the n-MOS transistor pairs of each of the first and the second switch sections 42 and 47 are turned on to cause an electric current to flow in the form of an analog signal given from the current sources I0 to $2^9 \times$I0. From this fact, it is understood that each of the first and the second switch sections 42 and 47 serves to produce the analog signal corresponding to the transmit signal of ten bits. Thus, each combination of the controller 41 or 46 and the switch section 42 or 47 is operable to convert the transmit (TX) signal of ten bits into the analog signal which is produced in the form of the electric current. In addition, the first and the second switch sections 41 and 46 form an output circuit in the first and the second digital-to-analog converters (DAC).

The analog signal which is specified by the electric current in FIG. 6 is given between the replica resistor elements 16a and 16b and is delivered to both the transformer 21 and the series circuit 302 of the variable impedance circuit 30.

The illustrated MOS transistors of the series circuits 302 in the variable impedance circuit 30 are turned on or off by the selector 32 to control the impedance of the variable impedance circuit 30 in the manner mentioned in conjunction with FIG. 5.

In the active hybrid transformer circuit illustrated in FIG. 6, the digital signal which is given as the input signal in the form of a voltage signal is converted into a current signal by the use of each combination of the first and the second controllers 41 and 46 and the first and the second switch sections 42 and 47. As mentioned above, each combination of the first and the second controllers 41 and 46 and the first and the second switch sections 42 and 47 serves as the digital-to-analog converter (DAC) and also serves as a voltage-to-current converter.

Using the first and the second digital-to-analog converters (DAC) as the voltage-to-current converters is helpful to quickly convert the voltage signal into the current signal.

With this structure, it is possible to adjust the current ratio $\alpha$ between the replica driver 11 and the current driver 10 to an optimum value by selecting the impedance of the variable impedance circuit 30 in a manner similar to that illustrated in FIG. 1.

Figure 7:
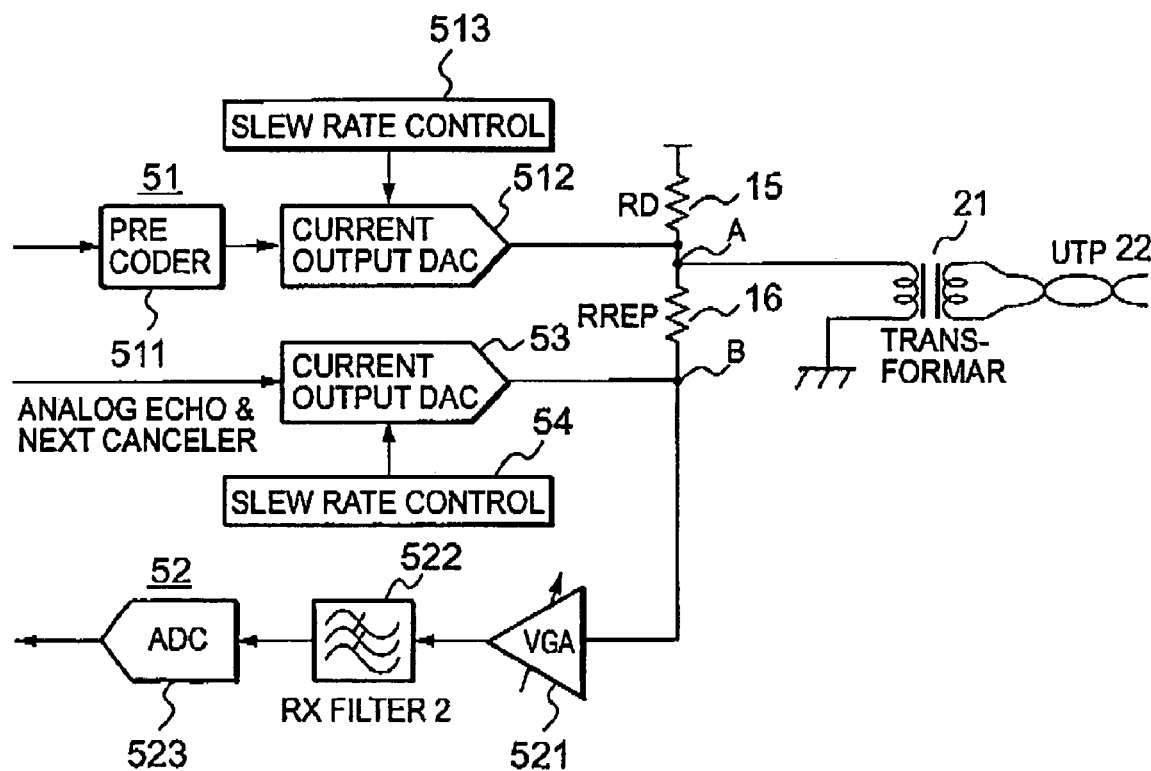
FIG. 7 shows a circuit diagram for describing an active hybrid transformer circuit according to a third embodiment of this invention.

Referring to FIG. 7, an active hybrid transformer circuit according to a third embodiment of this invention has a transmit (TX) side 51, a receive (RX) side 52, the load resistor 15, the replica resistor 16 connected between the points A and B, and the transformer 21 connected between the point A and the ground.

The transmit (TX) side 51 includes a pre-coder 511 and a digital-to-analog converter (DAC) 512 with a slew rate controller 513 while the receive (RX) side 52 includes a variable gain amplifier (VGA) 521, a receive (RX) filter 522, and an analog-to-digital converter (ADC) 523. The DAC 512 is formed by a converter of a current output type and is similar in operation to the current driver 10 illustrated in FIG. 5.

Furthermore, the illustrated transformer circuit has a digital-to-analog converter (DAC) 53 of a current output type which has a slew rate controller 54 and which is operable as the replica driver 11 (illustrated in FIG. 5). The digital-to-analog converter (DAC) 53 is given an analog signal through a digital filter included in an analog echo canceller (not shown) and is operable as the replica driver 11. Herein, it is to be noted that the digital filter included in the analog echo canceller can be trained by a training signal to cancel any echo.

Taking the above into consideration, it is possible to control the output current of the DAC 53 by training the digital filter by the use of the training signal. This shows that the current ratio between the replica driver 11 and the current driver 10 can be controlled so as to satisfy Equation (11) by training the digital filter by the training signal. In other words, the current ratio can be converged to a value that is extremely close to Equation (11).

With this structure, it is to be noted that the receive (RX) side 52 includes neither subtracter nor feedback loop from the analog echo canceller to the receive (RX) side.

Referring to FIG. 8, the active hybrid transformer circuit shown in FIG. 7 is specifically illustrated and comprises the digital-to-analog converter (DAC) 512 and the digital-to-analog converter (DAC) 53, like in FIG. 7. The DAC 512 is implemented by a first controller 515 operable in response to a transmit signal of ten bits and a first switch section 516 while the DAC 53 illustrated in FIG. 8 is also implemented by a second controller 531 of ten bits and a second switch section 532. The first switch section 516 is structured by ten pairs of n-MOS transistors and ten current sources connected to the respective pairs of the n-MOS transistors and depicted by I0 to $2^9 \times I0$. Likewise, the second switch section 532 is also structured by ten pairs of n-MOS transistors and ten current sources connected to the respective pairs of the n-MOS transistors and depicted by I0 to $2^9 \times I0$. The first and the second switch sections 516 and 532 are operable in a manner similar to the first and the second switch sections 42 and 46 illustrated in FIG. 6 and serve as output circuits of the DAC 513 and 53, respectively.

A pair of output terminals of the switches 516 are connected to points A' and A" while a pair of output terminals of the switches 532 are connected to points B' and B". Like in FIG. 6, replica resistor elements 16a and 16b are connected between the points A' and B' and between points A" and B", respectively.

Although the above description has thus far been made on the assumption that the current ratio $\alpha(j\omega)$ is represented by a complex number, it has been confirmed that this invention is available even when a current ratio has only a real part.

Figure 9A:
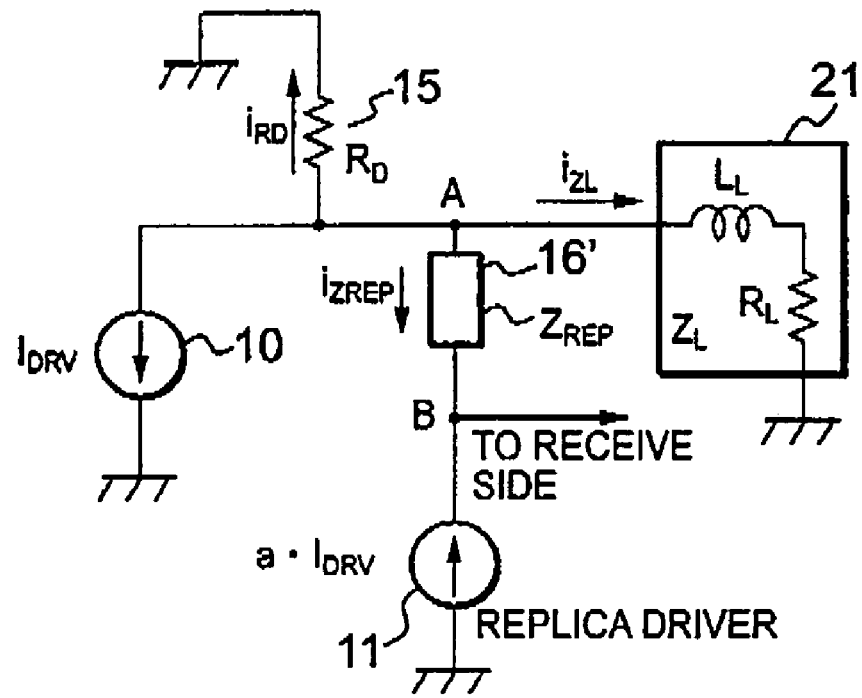
FIGS. 9A and 9B show circuit diagrams for describing an active hybrid transformer circuit according to a fourth embodiment of this invention.
Figure 9B:
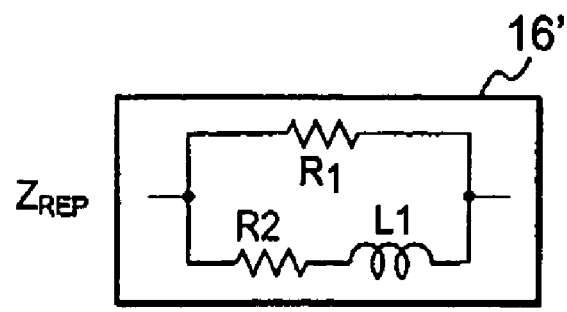

Referring to FIGS. 9A and B, another active hybrid transformer circuit according to a four embodiment of this invention is shown by an equivalent circuit and comprises similar parts designated by like reference numerals. In FIG. 9A, a replica driver 11 is connected to a replica impedance $(Z_{REP})$ 16' in series, as shown in FIG. 9B. The replica impedance $(Z_{REP})$ 16' illustrated in FIG. 9B is specified by a parallel circuit of a resistor R1 and a series circuit of a resistor R2 and an inductance L1. On the other hand, an impedance (namely, a path impedance) $Z_L$ illustrated in FIG. 9A is featured by a series circuit of an inductance $L_L$ and a resistor $(R_L)$.

In the example illustrated in FIGS. 9A and 9B, the following equations (12) to (15) holds at the connection point A.

$$I_{DRV} + i_{ZREP} + i_{ZL} + i_{RD} = 0, \quad (12)$$

$$i_{RD} = vA/R_D, \quad (13)$$

$$i_{ZL} = vA/Z_L, \text{ and} \quad (14)$$

$$i_{ZREP} = (vA - vB)/Z_{REP} \quad (15)$$

Under the circumstances, when vB=0, the current flowing through the connection point B is represented by:

$$i_{REP} + \alpha I_{DRV} = 0 \quad (16)$$

In this event, the voltage vA in Equation (14) is rewritten by the use of

Equations (15) and (16) into:

$$vA = -I_{DRV} \times Z_{REP}, \quad (17)$$

Substituting (17) into (13) and (14) gives:

$$i_{RD} = -\alpha I_{DRV} Z_{REP}/R_D, \text{ and} \quad (18)$$

$$i_{ZL} = -\alpha I_{DRV} Z_{REP}/Z_L, \quad (19)$$

Modifying Equation (16) and substituting Equations (18) and (19) into Equation (12) give:

$$\alpha I_{DRV}(Z_{REP}((1/R_D)+(1/Z_L))+1)=1. \quad (20)$$

As a result, the replica impedance $Z_{REP}$ is represented by:

$$Z_{REP} = ((1/\alpha)-1)(R_D//Z_L). \quad (21)$$

From the above, it is possible to implement the active hybrid transformer circuit which satisfies the above-mentioned conditions by using a combination of the real part of the current ratio with a passive element. Practically, the replica impedance $Z_{REP}$ can be realized by the circuit illustrated in FIG. 9B. Namely, the illustrated circuit is specified by R1=800 ohms, R2=800 ohms, and L1=256 nH when RD=100 ohms, RL=100 ohms, LL=32 nH, and $\alpha=\frac{1}{9}$.

Figure 10:
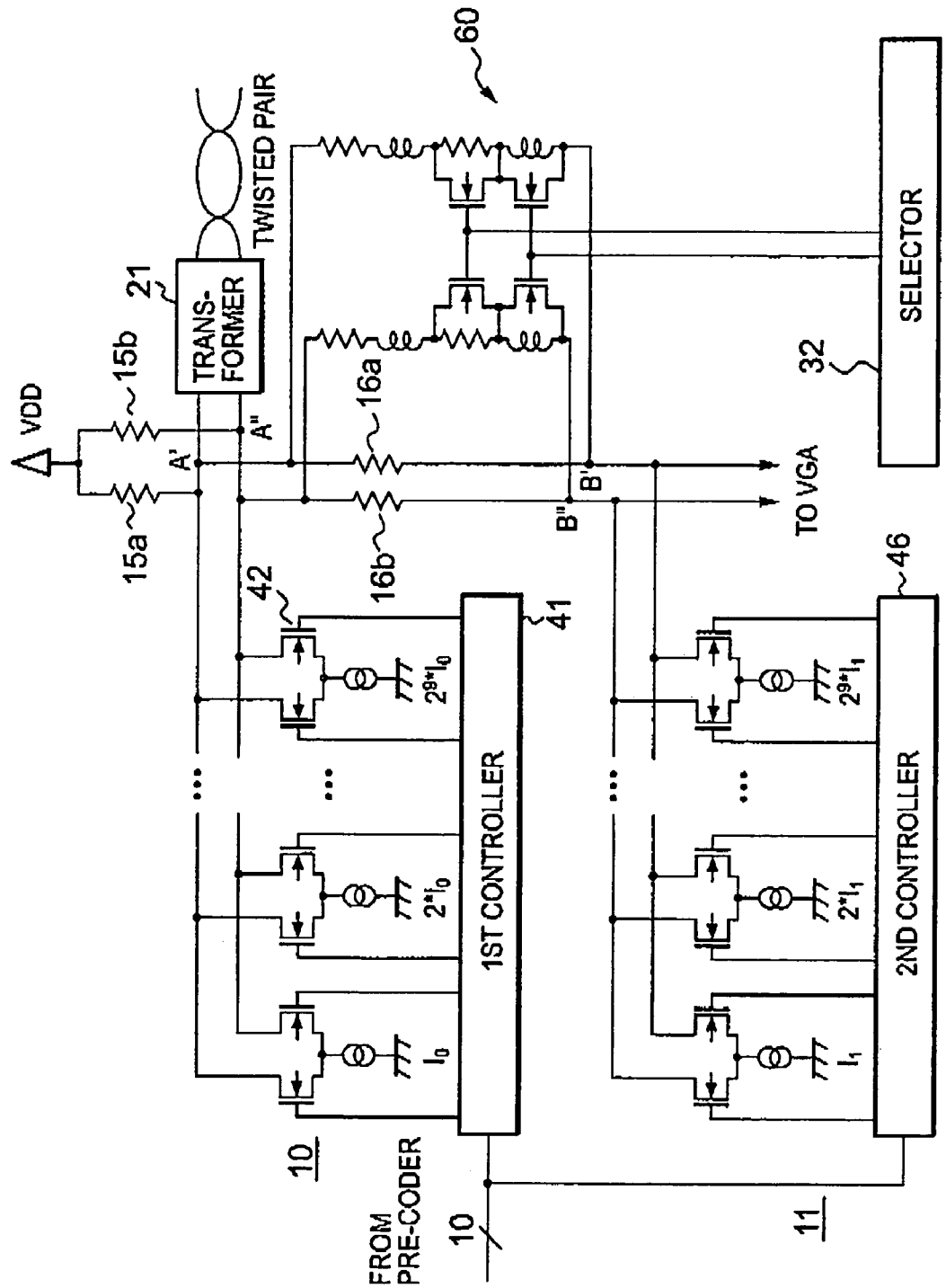
FIG. 10 shows a concrete circuit diagram of the active hybrid transformer circuit illustrated in FIGS. 9A and 9B.

The active hybrid transformer circuit illustrated in FIGS. 9A and B can be practically implemented by a circuit that is shown in FIG. 10. The circuit illustrated in FIG. 10 is similar to that illustrated in FIG. 6 except that a replica impedance circuit 60 is connected to the selector 32 instead of the replica resistor 16 and is interposed between the replica driver 11 and the transformer 21. The illustrated replica impedance circuit 60 provides the replica impedance $(Z_{REP})$ and is structured by the replica resistors 16a and 16b and variable impedance circuits connected in parallel with the replica resistors 16a and 16b, respectively. The variable impedance circuits vary their impedances in response to switch signal sent from the selector 32. Thus, the illustrated replica impedance circuit 60 can control an impedance value from one to another so as to satisfy Equation (21) and, as a result, to completely isolate the receive (RX) side from the transmit (TX) side.

While this invention has thus far been described in conjunction with a few embodiments thereof, it is readily possible for those skilled in the art to put this invention into practice in various other manners.

What is claimed is:

1. An active hybrid transformer circuit for use in bi-directional metallic cable communication to separate a transmit (TX) signal and a receive signal (RX), comprising:
    a current driver for the transmit signal;
    a load resistor connected to a first common node connected to a one terminal of the current driver;
    a first end of a replica resistor connected to the first common node;
    a transmission path connected to the first common node;
    a second end of the replica resistor connected to a second common node;
    a replica driver connected to the second common node and directly connected to the second end of the replica resistor; and
    the second common node, connecting the replica driver to the replica resistor, and being connected to a receive side.

2. An active hybrid transformer circuit as claimed in claim 1, wherein a current ratio between the current driver and the replica driver is represented by a complex number.

3. An active hybrid transformer circuit as claimed in claim 2, wherein the complex number has a real part and an imaginary part, at least one of the real part and the imaginary part being variable.

4. An active hybrid transformer circuit as claimed in claim 1, wherein the current ratio is given by:

$$-(R_D/Z_L)/(R_D//Z_L+R_{REP}),$$

where $R_D$ is representative of a resistance value of the load resistor; $R_{REP}$ is a resistance value of the replica resistor; and $Z_L$ is an impedance seen from a transmitter receiver to the transmission path circuit.

5. An active hybrid transformer circuit as claimed in claim 4, wherein the current ratio is represented by the complex number which has a real part and an imaginary part, at least one of the real part and the imaginary part being variable.

6. An active hybrid transformer circuit as claimed in claim 1, further comprising:
a circuit element which includes at least one of a capacitor, an inductor, and a resistor and which is connected in parallel with the replica driver.

7. An active hybrid transformer circuit as claimed in claim 6, wherein the circuit element is variable.

8. An active hybrid transformer circuit as claimed in claim 4, wherein the replica driver comprises:
a digital filter circuit which varies at least one of the real part and the imaginary part and which has an impedance circuit.

9. An active hybrid transformer circuit as claimed in claim 8, wherein a real part and an imaginary part of an impedance in the impedance circuit are equal to those of the impedance $Z_L$, respectively.

10. An active hybrid transformer circuit as claimed in claim 1, wherein the current driver and the replica driver are implemented by a digital-to-analog converter (DAC) of a current output type.

11. An active hybrid transformer circuit as claimed in claim 1, wherein the replica driver is a digital to analog converter connected to a digital filter trained by a training signal.

12. An active hybrid transformer circuit for use in bi-directional metallic cable communication to separate a transmit (TX) signal and a receive signal (RX), comprising:
a current driver for the transmit signal;
a load resistor connected to a first common node connected to a one terminal of the current driver;
a first end of a replica impedance connected to the first common node;
a transmission path connected to the first common node;
a second end of the replica impedance connected to a second common node;
a replica driver connected to the second common node and directly connected to the second end of the replica impedance; and
the second common node, connecting the replica driver to the replica impedance, and being connected to a receive side.

13. An active hybrid transformer circuit as claimed in claim 12, wherein the current ratio a has only a real part and the replica impedance $Z_{REP}$ is given by:

$Z_{REP}=((1/\alpha)-1(R_D//Z_L)$, where $R_D$ is representative of a resistance value of the load resistor; and $Z_L$ is an impedance seen from a transmitter receiver to the transmission path circuit.

* * * * *